No. 850,420. PATENTED APR. 16, 1907.
J. E. COOPER & P. A. OLIVER.
KNIFE HANDLE.
APPLICATION FILED MAR. 19, 1906.
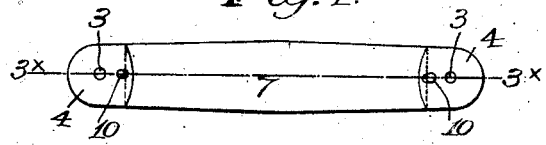
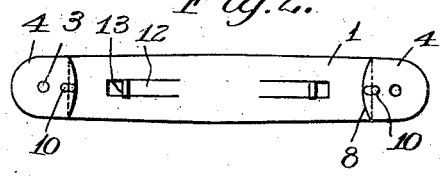
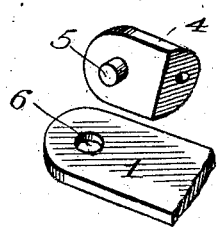
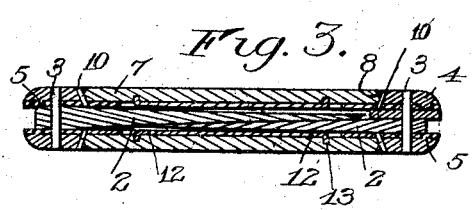
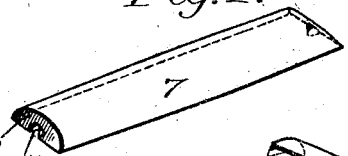
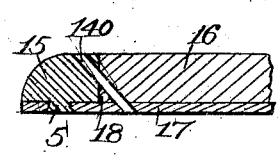
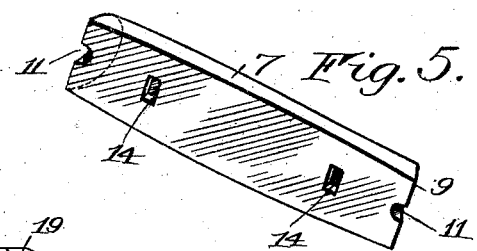
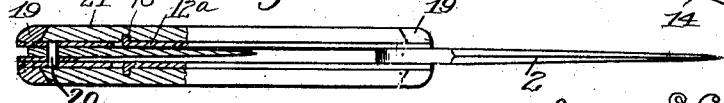
Witnesses
H. Willard Rich.
Florence E. Franck
Inventors
James E. Cooper
Pruce A. Oliver
By Frederick S. Church
their Attorney

UNITED STATES PATENT OFFICE.

JAMES E. COOPER AND PRINCE A. OLIVER, OF PERRY, NEW YORK, ASSIGNORS TO ROBESON CUTLERY COMPANY, OF ROCHESTER, NEW YORK, A CORPORATION OF NEW YORK.

KNIFE-HANDLE.

No. 850,420.

Specification of Letters Patent.

Patented April 16, 1907.

Application filed March 19, 1906. Serial No. 306,725.

*To all whom it may concern:*

Be it known that we, JAMES E. COOPER and PRINCE A. OLIVER, of Perry, in the county of Wyoming and State of New York, have invented certain new and useful Improvements in Knife-Handles; and we do hereby declare the following to be a full, clear, and exact description of the same, reference being had to the accompanying drawings, forming a part of the specification, and to the reference-numerals marked thereon.

Our present invention relates to cutlery, and particularly to pocket-knives; and it has for its object to provide an improved means of securing the cap-pieces or bolsters and the scale or handle-pieces whereby the former may be rigidly united to the underlying bolster-scales and the latter secured between the caps or bolsters in such a manner that the appearance of the knife will be enhanced and in instances where the scale or handle-pieces are made of pearl, ivory, ebony, or similar substances they will be protected from becoming cracked or broken.

To these and other ends the invention consists in certain improvements and combinations of parts, all as will be hereinafter more fully described, the novel features being pointed out in the claims at the end of the specification.

In the drawings, Figure 1 is a side elevation of the pocket-knife constructed in accordance with our invention. Fig. 2 is a similar view with the scale or handle-piece removed. Fig. 3 is a longitudinal sectional view on the line 3× 3× of Fig. 1. Figs. 4 and 5 are perspective views showing the inner and outer faces of a scale or handle-piece. Fig. 6 is a detail perspective view of one end of a bolster-scale and one of the caps fitting thereon. Fig. 7 is a detail sectional view showing a modified form of the scale or handle-piece connections. Fig. 8 is a view similar to Fig. 3, illustrating the application of the invention to a tip-knife.

Similar reference-numerals in the several figures indicate similar parts.

It has been a common method in the construction of pocket cutlery to secure the scale or handle-pieces to the metallic portions of the knife by extending through them the ends of the pintles or rivets on which the knife-blades are journaled. This construction possesses certain disadvantages, owing to the frangible nature of the finer grades of handle-pieces, which are composed of pearl, tortoise-shell, ivory, or ebony, because the perforations in the handle-pieces, which are placed near their ends, weaken them and permit their extremities to be easily cracked or broken when the pintles are subjected to undue pressure by a lateral force applied to their respective blades. Again, the rivets piercing the scale or handle-pieces have their ends exposed, making noticable points at each side of the knife, which detracts from its appearance. The previous method of construction has also been an expensive one, as the upsetting of the ends of the rivets or pintles to secure the scales or handle-pieces in position often results in breaking the latter during the process of manufacture, and as in such a knife the handle-pieces are attached after the other parts are assembled a broken handle necessitates a removal of the rivets and the insertion of new ones.

In carrying out our present invention, with a view of obviating the disadvantages heretofore encountered and for the purpose of producing pocket cutlery more expeditiously and which shall possess a more pleasing appearance to the eye, we arrange the inner ends of the bolsters and the coöperating ends of the scale or handle-pieces so that they overlap, thereby holding the latter in engagement with the knife-frame or bolster-scales, and we employ additional devices which prevent the handle-pieces from lateral movement.

A knife constructed in accordance with our invention comprises the metallic frame-pieces 1, which in the finished article are assembled at each side of the blades 2, journaled upon the pintles or rivets 3, as shown in Fig. 3. Both sides of the knife are constructed alike, so a description of one of them will be sufficient. The bolster-scale 1 is provided at each end with a cap-piece or bolster 4, provided on its lower side with a stud or lug 5, preferably formed integrally therewith and adapted to pass through an aperture 6 at the end of the bolster-scale and to be upset against the inner surface of the latter. In arranging these parts it is preferable to locate the stud or lug in proximity to the outer end of the bolster to more securely unite it to the bolster-scale and permit the aperture receiving the rivet or pintle 3 to be drilled in an approximately central position in the bolster without weakening its connection with the bolster-scale.

The handle-piece 7, which may be made of pearl, ivory, ebony, or other material, fills the intervening space between the inner ends of the bolsters 4, and in order to hold it in contact with the bolster-scale and prevent its outer movement thereon the inner ends of the bolsters are undercut, as indicated at 8, and the ends of the handle-piece are beveled or formed correspondingly, as indicated at 9 in Fig. 4, so that it may be inserted between the bolsters and moved laterally into the desired position. By this arrangement of the parts it will be seen that the handle-piece is prevented from longitudinal movement in either direction and is also held against outward movement relatively to the bolster-scale, but that it is capable of lateral movement. To prevent this, there is inserted in each bolster a pin or rivet 10, which is arranged at an angle and projects beyond the lower edge of its undercut end 8 and intersects the bottom portion of the beveled end 9 on the handle-piece, engaging the sides of a notch 11, formed therein by the boring operation performed to provide an aperture for the reception of the pin 10. While it is not essential, it is a preferred construction to extend the inner ends of the rivets 10 through the adjacent portion of the bolster-scale, as they may be conveniently employed as means for further securing these parts in rigid engagement.

To facilitate assembling the parts and to secure the handle-pieces to the bolster-scale during the operation of drilling the apertures through which the rivets 10 are passed, the bolster-scale is provided with two fingers 12, formed integrally therewith, by severing the material, as indicated in Fig. 2, having the laterally-bent ends 13, forming transversely-extending locking projections, the edges of which are adapted to coöperate with the sides of recesses 14, provided in the inner faces of the handle-piece 7, as shown in Fig. 5. The projections 13 may be depressed when the handle-piece is inserted between the bolsters 4, permitting it to be moved laterally until in the desired position, when they will be moved outwardly by the resilient action of their supporting-fingers. The latter are preferably located at opposite ends of the bolster-scale in proximity to the two cap-pieces, and it will be seen that the handle-piece is rigidly held in the desired position during the operation of drilling the apertures and inserting the rivets 10.

In certain classes of knives the rivets 10 may be dispensed with and the movable projections engaging the handle-pieces employed as means for securing them against lateral movement both during the process of construction and after it has become a finished article. The yielding projections are particularly desirable as means for temporarily securing the handle-pieces, as the latter, the bolster-scales, and bolsters may be ground and finished before they are united with the blades and other coöperating parts, such as the usual spring or springs. Thus when the handle-piece proves defective or is injured in the process of assembling it may be removed by retracting the spring-fingers and their projections, permitting a new piece to be substituted.

In Fig. 7 we have shown a modified means of securing a handle-piece, in which it is held in contact with the bolster-scale and prevented from outward and transverse movement by means of the securing-rivet 140. This construction is particularly adapted for knives provided with thick or heavy handles in which the abutting edges of the bolster 15 and the handle 16 may extend at right angles to the bolster-scale 17, the pin 14 in this instance being arranged at such an angle that it passes through the end of the handle-piece above the lower end corner 18 thereof.

The illustration in Fig. 8 shows the invention applied to that style of pocket cutlery known as "tip-knives," in which the bolsters (indicated by 19) do not serve to support the ends of the blade-pintles 20, but are located at the outer ends of the knife beyond the pintles. Our invention may be conveniently employed in the construction of a knife of this character, for by providing the bolster-scales with the spring-fingers $12^a$, having the projections $13^a$ thereon which enter apertures in the handle-pieces 21, the latter may be applied after the metallic portions of the knife have been assembled.

Pocket cutlery embodying our invention may be manufactured cheaply and the handle-pieces thereof secured against removal in the finished article and protected against injury.

We claim as our invention—

1. In a knife-handle, the combination with a bolster-scale and a handle-piece thereon provided with a recess in its lower side, of bolsters engaging the ends of the handle and preventing it from outward and longitudinal movement relatively to the bolster-scale and a locking projection on the latter coöperating with said recess to secure the handle against transverse movement.

2. In a knife-handle, the combination with a bolster-scale and a removable handle-piece fitting thereon having a recess in its lower side, of a locking projection movable transversely of the bolster-scale and engaging in the recess and means for holding the handle in contact with the bolster-scale.

3. In a knife comprising a bolster-scale and bolsters thereon, of a handle-piece provided with a recess and fitted between the bolsters and held in contact with the bolster-scale and a movable locking projection on the latter engaging the recess.

4. In a knife, the combination with a bolster-scale, a yielding finger formed therein having an outwardly-projecting end and a handle-piece provided with a recess coöperating with the end of said finger, of bolsters secured to the bolster-scale abutting and overlapping the ends of the handle-piece.

5. In a knife, the combination with a bolster-scale, an integrally-formed finger thereon having a lateral projection, of a handle-piece provided with a recess coöperating with said projection and bolsters engaging the handle to hold it in contact with the bolster-scale.

6. In a knife, the combination with a bolster-scale, bolsters thereon and a handle-piece provided with a recess and movable laterally of the bolster-scale between the bolsters and held in engagement therewith by said bolsters, of a spring-finger on the bolster-scale and a projection thereon coöperating with the recess to lock the handle in operative position.

7. In a knife, the combination with a bolster-scale, a handle-piece thereon having a recess in its lower side and a locking projection on the bolster-scale entering the recess, of bolsters abutting the ends of the handle-piece and rivets passing through the bolsters and engaging the ends of the scale-piece.

8. In a knife, the combination with a bolster-scale, a handle-piece thereon having a recess in its lower side and a locking projection on the bolster-scale entering the recess, of bolsters secured to the bolster-scale having their inner ends projecting over the ends of the handle-piece and rivets passing through the bolsters at an angle and engaging the underlying ends of the handle-piece.

9. In a pocket-knife, the combination with a bolster-scale, and a handle-piece thereon, of bolsters on the bolster-scale abutting the ends of the handle-piece and rivets passing through the bolsters at an angle to the faces of said abutting parts and engaging the ends of the handle-piece beneath their outer sides.

10. In a pocket-knife, the combination with a bolster-scale and a handle-piece thereon, having beveled ends, of bolsters on the bolster-scale provided with undercut ends overhanging the ends of the handle-piece and rivets passing through the bolsters and engaging the ends of the handle-piece.

11. In a pocket-knife, the combination with bolster-scales provided with apertures at their ends and bolsters arranged on the outer surfaces of the scales having lugs adapted to pass through said apertures and be upset against the inner surfaces of the scales, of blades located between the bolster-scales and pintles passing through the bolsters, scales and blades.

12. In a pocket-knife, the combination with blades, bolster-scales arranged at each side thereof and provided with apertures at their ends and pintles securing the blades and scales, of bolsters arranged on the outer faces of the latter provided with integrally-formed lugs passing through the apertures and securing the bolster-scales by engaging the inner faces thereof.

JAMES E. COOPER.
PRINCE A. OLIVER.

Witnesses:
SADIE CORYELL,
E. V. JENKS.